(12) United States Patent
Simske et al.

(10) Patent No.: US 10,540,486 B2
(45) Date of Patent: *Jan. 21, 2020

(54) TRANSACTION MEDIUM

(71) Applicant: Hewlett-Packard Development Company, L.P., Houston, TX (US)

(72) Inventors: Steven J Simske, Fort Collins, CO (US); Omer Gila, Palo Alto, CA (US); Henryk Birecki, Palo Alto, CA (US); Napoleon J Leoni, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/515,959

(22) PCT Filed: Oct. 30, 2014

(86) PCT No.: PCT/US2014/063068
§ 371 (c)(1),
(2) Date: Mar. 30, 2017

(87) PCT Pub. No.: WO2016/068924
PCT Pub. Date: May 6, 2016

(65) Prior Publication Data
US 2017/0300674 A1 Oct. 19, 2017

(51) Int. Cl.
*G06F 12/00* (2006.01)
*G06F 21/31* (2013.01)
(Continued)

(52) U.S. Cl.
CPC .............. *G06F 21/31* (2013.01); *G02F 1/167* (2013.01); *G09G 3/344* (2013.01); *G09G 2358/00* (2013.01); *G09G 2380/14* (2013.01)

(58) Field of Classification Search
USPC ......................................................... 713/159
See application file for complete search history.

(56) References Cited

U.S. PATENT DOCUMENTS 4,806,745 A 2/1989 Oogita
4,868,376 A 9/1989 Lessin et al.
(Continued)

FOREIGN PATENT DOCUMENTS

KR 10-2003-0084037 A 11/2003
KR 10-2010-0048710 A 5/2010
(Continued)

OTHER PUBLICATIONS

Apec Business Nobility Group: sA Guide to Biometric Technology in Machine Readable Travel Documents APEC Business Mobility Group APEC Committee on Trade and Investment, Aug. 31, 2007, Retrieved from the Internet: https://www.apec.org/-/media/APEC/Publications/2887/8/A-Guide-to-Biometric-Technology-in-Machine-Readable-Travel-Documents /87 cti biometric BINDER.pdf [retrieved on 2818-84-26].

(Continued)

*Primary Examiner* — Amare F Tabor
(74) *Attorney, Agent, or Firm* — Dicke Billig & Czaja PLLC

(57) ABSTRACT

A transaction medium comprises a non-e-paper portion and a passive e-paper display portion to display a first expression of an authentication element in a secure representation. The first expression is related to a second expression of the authentication element, wherein a comparison of the first expression and the second expression determines authentication.

15 Claims, 7 Drawing Sheets

(51) Int. Cl.
*G09G 3/34* (2006.01)
*G02F 1/167* (2019.01)

(56) References Cited

U.S. PATENT DOCUMENTS

| | | | |
|---|---|---|---|
| 4,874,934 | A | 10/1989 | Nakahara et al. |
| 5,590,038 | A | 12/1996 | Pitroda |
| 5,866,284 | A | 2/1999 | Vincent |
| 6,333,754 | B1 | 12/2001 | Oba et al. |
| 6,515,790 | B2 | 2/2003 | Miyamoto et al. |
| 6,982,734 | B2 | 1/2006 | Pan et al. |
| 7,140,550 | B2 | 11/2006 | Ramachandran |
| 7,580,845 | B2 | 8/2009 | Burman et al. |
| 8,144,388 | B2 | 3/2012 | Ogawa |
| 8,281,142 | B2 * | 10/2012 | Jung ................. G06F 21/60 345/107 |
| 8,290,876 | B1 * | 10/2012 | Powell ................. G06Q 20/10 705/64 |
| 8,322,624 | B2 * | 12/2012 | Finn ................. G06K 19/0723 235/492 |
| 8,511,563 | B2 * | 8/2013 | Cohen ................. G06F 1/1613 235/375 |
| 8,514,256 | B2 | 8/2013 | Ogawa et al. |
| 8,783,578 | B2 | 7/2014 | Kim |
| 8,955,746 | B2 * | 2/2015 | Boelter ................. G06F 21/31 235/382 |
| 2003/0067427 | A1 | 4/2003 | Comiskey et al. |
| 2003/0132924 | A1 * | 7/2003 | Hamilton ............. G06F 3/147 345/204 |
| 2005/0134550 | A1 | 6/2005 | Schmitz |
| 2005/0144446 | A1 | 6/2005 | Kishimoto |
| 2006/0017659 | A1 | 1/2006 | Ogawa et al. |
| 2007/0045399 | A1 | 3/2007 | Martin |
| 2011/0298760 | A1 | 12/2011 | Gila et al. |
| 2012/0206341 | A1 | 8/2012 | Gila et al. |
| 2012/0217303 | A1 | 8/2012 | Krawezewicz et al. |
| 2012/0284121 | A1 * | 11/2012 | Pan ................. G06Q 20/3274 705/14.53 |
| 2012/0320001 | A1 | 12/2012 | Gila et al. |
| 2013/0003162 | A1 | 1/2013 | Leoni et al. |
| 2013/0086389 | A1 | 4/2013 | Suwald |
| 2013/0235446 | A1 | 9/2013 | Leoni et al. |
| 2014/0168201 | A1 * | 6/2014 | Jung ................. G06Q 10/087 345/214 |
| 2014/0210805 | A1 | 7/2014 | Birecki et al. |
| 2014/0239068 | A1 | 8/2014 | Park |
| 2014/0253426 | A1 | 9/2014 | Leoni et al. |
| 2016/0342064 | A1 * | 11/2016 | Gila ................. B41J 3/4076 |

FOREIGN PATENT DOCUMENTS

| | | |
|---|---|---|
| WO | WO-2009095263 A1 | 8/2009 |
| WO | WO-2013019701 A1 | 2/2013 |

OTHER PUBLICATIONS

Rippen et al.; Interactive Multitask Credit Card Technology; Portable07. IEEE International Conference, May 25-29, 2007.
"Pliable e-Ink for Server Diagnose" ip.com Journal, ip.com Ink., West Henrietta, NY, US, Jul. 24, 2014 (Jul. 25, 2014), Available at: https://priorart.ip.com/IPCOM/000238005.

* cited by examiner

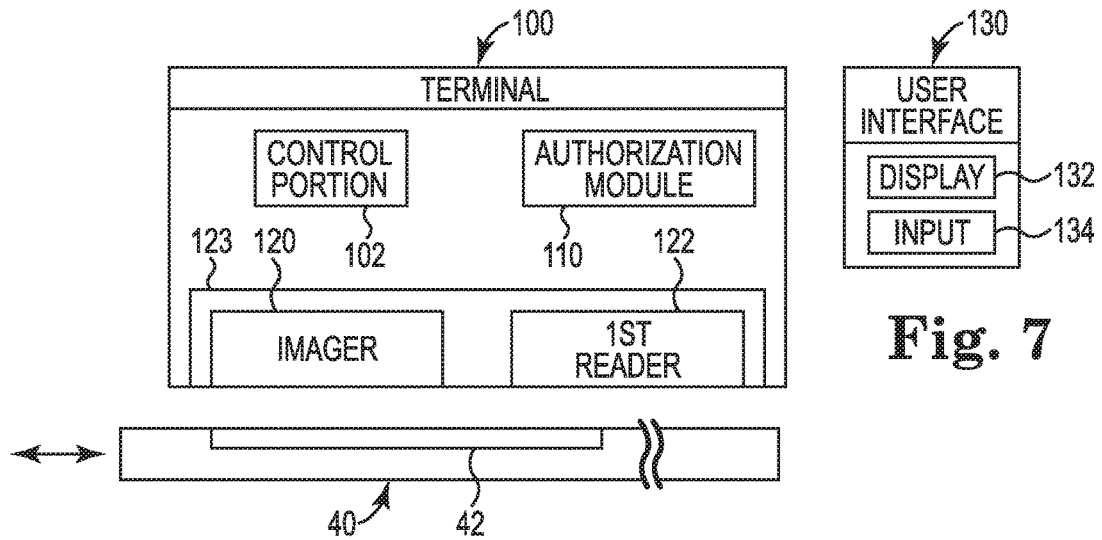
Fig. 6
Fig. 7
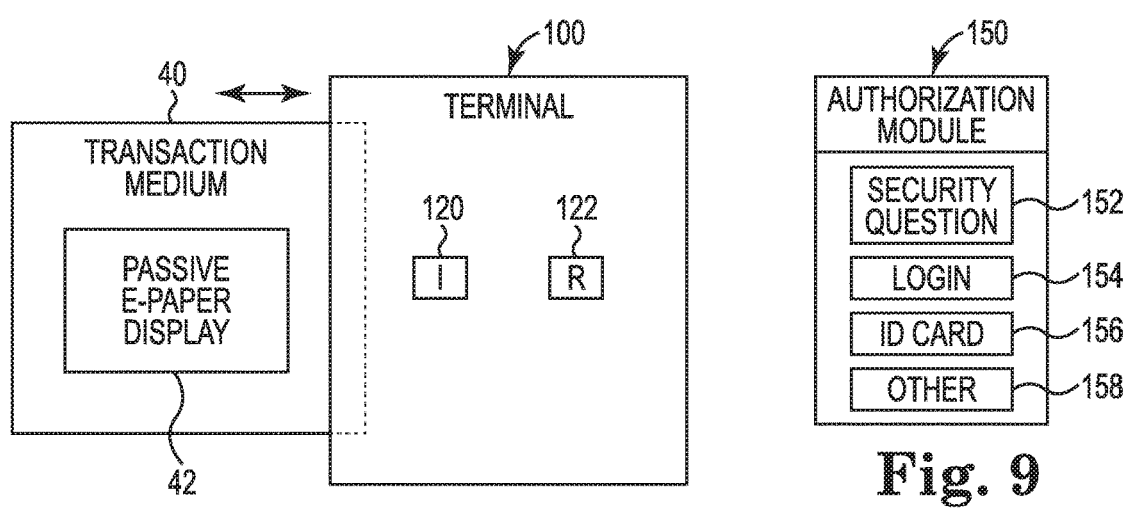
Fig. 8
Fig. 9
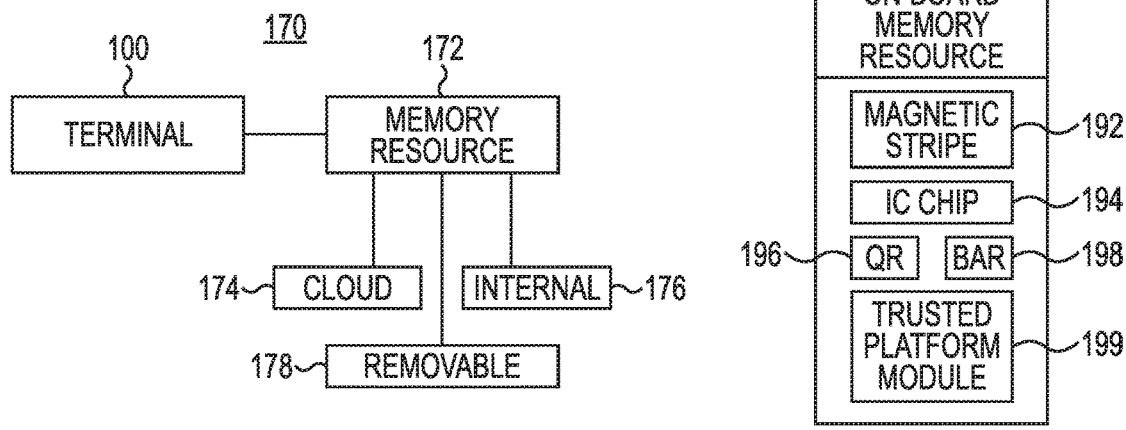
Fig. 10
Fig. 11

TRANSACTION MEDIUM

BACKGROUND

Electronic paper ("e-paper") is a display technology designed to recreate the appearance of ink on ordinary paper. Some examples of e-paper reflect light like ordinary paper and may be capable of displaying text and images. Some e-paper is implemented as a flexible, thin sheet, like paper. One familiar e-paper implementation includes e-readers.

BRIEF DESCRIPTION OF THE DRAWINGS

FIG. 6 is a block diagram schematically illustrating a terminal for writing and reading relative to a transaction medium, according to one example of the present disclosure.

FIG. 7 is a block diagram schematically illustrating a user interface, according to one example of the present disclosure.

FIG. 8 is a plan view schematically illustrating a transaction medium operatively coupled relative to a terminal, according to one example of the present disclosure.

FIG. 9 is a block diagram schematically illustrating an authorization module, according to one example of the present disclosure.

FIG. 10 is a block diagram schematically illustrating a memory resource in association with a terminal, according to one example of the present disclosure.

FIG. 11 is a block diagram schematically illustrating an on-board memory resource in association with a transaction medium, according to one example of the present disclosure.

DETAILED DESCRIPTION

Figure 1A:
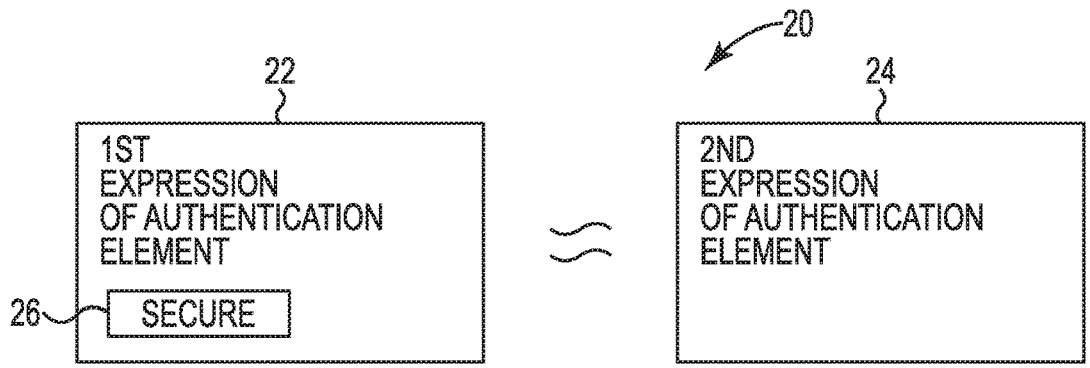
FIG. 1A is a block diagram schematically illustrating a security arrangement, according to one example of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense.

At least some examples of the present disclosure are directed to a security arrangement for use in association with a transaction medium. The security arrangement includes a first expression of an authentication element and a second expression of the authentication element. The first expression is a secure representation. The secure, first expression is substantively related to the second expression, such that a comparison of the first expression and the second expression is used to determine authentication. In some examples, such comparison is performed according to various scrambling-based security protocols.

In some examples, the secure representation includes some form of scrambling (e.g. obscuring, embedding, serialization, encrypting or otherwise preventing at least some information from being recognized via unaided human interpretation) according to at least one scrambling-based security protocol. In general terms, a scrambling-based security protocol provides a formulaic means of mapping from an original string to an obscured string. In some examples, encryption provides for a formulaic encoding of the original string, which has maximum entropy. In at least some examples, the term "secure" is used in a relative sense in which the extent to which the representation is considered "secure" is dependent on the number of bits being encrypted, the number of unique serializations, etc. It will be understood that an appropriate level of "securing" the representation is implemented in accordance with the intended environment in which the transaction medium will be used.

In some examples, a transaction medium comprises a non e-paper portion and a passive e-paper, display portion. In some instances, the secure, first expression of the authentication element is selectively formed as an image on the passive e-paper display portion. In some examples, the second expression is permanently visible on a portion of the transaction medium, while in some examples the second expression is selectively visible on a portion of the transaction medium. In some examples, the second expression is not visible on the transaction medium but is accessible via other mechanisms as further described herein.

In some examples, the transaction medium includes a forensic security indicia formed or printed on the transaction medium. In general terms, the forensic security indicia provides an additional level of physical security to ensure authenticity of the transaction medium presented at the terminal. Accordingly, even in the event that the authentication element or authorization scheme(s) associated with the terminal were compromised, the forensic security indicia would provide an additional mechanism by which to evaluate the authenticity of a transaction medium. In some examples, the forensic security indicia is substantively linked to the first expression of the first authentication element while in some examples, the forensic security indicia is substantively independent of the first expression of the authentication element. In some examples, the forensic security indicia is visible on the non e-paper portion of the transaction medium.

In some examples, the transaction medium is used to ensure secure access to perform a transaction, such as a financial transaction, a physical access transaction, an electronic access transaction, an information transaction, a supply chain transaction, etc.

In some examples, in order to provide such secure access, the transaction medium is deployed for use with a terminal including a first authorization module to determine user authorization upon communicative coupling of the transaction medium relative to the terminal. In some examples, communication with the user occurs via a display of the terminal while in some examples, communication with the user occurs via a passive e-paper display portion of the transaction medium card. The terminal includes an imager and a reader. The imager writes, upon user authorization, a secure expression of an authentication element in the passive e-paper display portion of the transaction medium. The reader reads the secure expression from the passive e-paper display portion. Authentication is determined via a comparison of the secure expression to a non-secure expression of the authentication element visible on a non-e-paper display portion of the transaction medium or accessible elsewhere, as later further described herein.

In some examples, the terminal includes an imager having an ion writing unit adapted for forming images via non-contact application of charges (e.g. ions) onto the spaced apart, passive e-paper display portion of the transaction medium.

Among other aspects, this general security arrangement (according to at least some examples of the present disclosure) provides a transaction medium that is low in cost because it is free of more complicated security arrangements, such as those involving power-based display systems on a card, biometric sensors, on-board power sources, etc.

Upon successful authentication via the security arrangement of the respective first and second expressions, secure access is enabled to the particular type of access to which the user has pre-established rights. In some examples, the transaction medium (according to at least some examples of the present disclosure) is used to achieve authentication but then other transaction mediums or mechanisms are used to initiate or perform an activity to which access has been granted via the authentication. In some examples, the transaction medium (according to at least some examples of the present disclosure) is used to achieve authentication but then also used to initiate or perform an activity to which access has been granted via the authentication.

Moreover, the security arrangement provided via at least some examples of the present disclosure address some of the limitations of ordinary card security, which have been frequently compromised, thereby subjecting consumers to fraud and uncertainty in participating in transactions. For example, the static nature of ordinary cards offer little protection regarding their authenticity at a point-of-sale, in over-the-phone, or online transactions. Moreover, typical point-of-sale terminals offer little protection against impostors or against system-wide theft of card credentials.

These examples, and additional examples, are described throughout the present disclosure and in association with at least FIGS. 1-22.

FIG. 1A is a block diagram of a security arrangement, according to one example of the present disclosure. As shown in FIG. 1A, the security arrangement 20 includes a first expression 22 of an authentication element and a second expression 24 of the authentication element. In one aspect, the first expression is a secure representation 26.

In some examples, the first expression 22 takes the form of a string of alphanumeric characters or symbols, at least one alphanumeric word, etc. In some examples, the first expression 22 takes the form of more complex two-dimensional pattern of alphanumeric characters, symbols, marks, etc. In some examples, the first expression 22 takes the form of a two-dimension graphic. In some examples, the first expression 22 takes the form of an image of a person or object, such as a photograph. Regardless of the particular form of the first expression 22, at least a portion of the first expression 22 is formed as a secure representation by which some form of obscuring, embedding, encrypting or otherwise preventing at least some information related to the authentication element from being recognized via unaided human interpretation.

In some examples, the second expression 24 is in a non-secure form such that one can recognize and interpret the second expression 24 without interpretive aids or electronic mechanisms. In some examples, the second expression 24 takes the form of a string of alphanumeric characters or symbols, at least one alphanumeric word, etc. In some examples, the second expression 24 takes the form of more complex two-dimensional pattern of alphanumeric characters, symbols, marks, etc. In some examples, the second expression 24 takes the form of a recognizable image familiar to the user.

In general terms, the second expression is substantively related to the first expression such that a comparison of the respective first and second expressions enables a determination of whether the card (or possessor of the card) is authentic. In one aspect, authentication determines that the transaction medium is genuine or valid and, therefore, is not an unauthorized copy or not a fake representation.

Figure 1B:
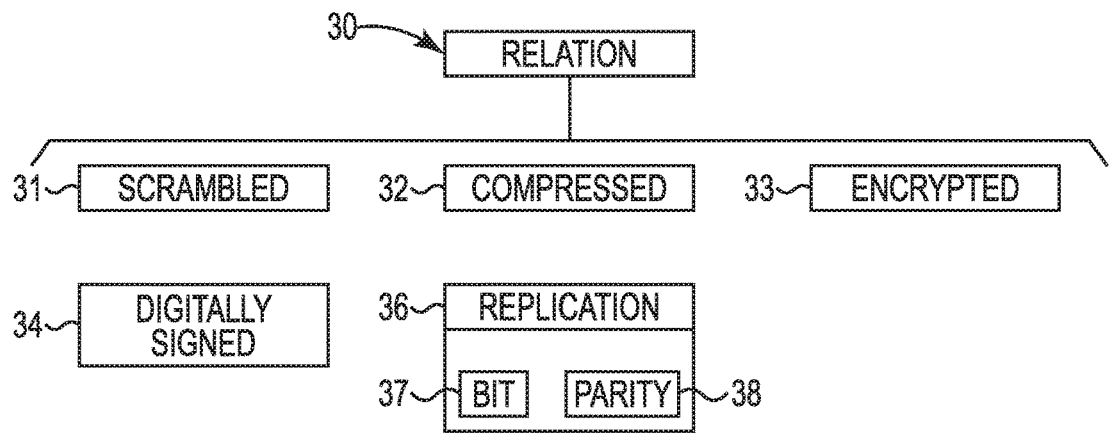
FIG. 1B is a block diagram schematically illustrating a plurality of modes in which a first expression of an authentication element is related to a second expression of the authentication element, according to one example of the present disclosure.

FIG. 1B is a block diagram schematically illustrating a plurality 30 of different relational arrangements between the first expression 22 and the second expression 24, according to one example of the present disclosure. In general terms, the first expression and the second expression are related in some substantive way sufficient to ensure genuineness of an article, such as a transaction medium, in possession of a user.

As shown in FIG. 1B, in some examples, the plurality 30 includes the first expression being a scrambled form 31 of the second expression 24, being a compressed form 32 of the second expression 24, being an encrypted form 33 of the second expression 24, being a digitally signed form 34 of the second expression 24, and a replication form 36 of the second expression 24. In some examples, the replication form 36 is a bit-checked replication 37 while in some examples, the replication form 36 is a parity-checked replication 38. In some examples, the digitally signed form 34 includes a public key infrastructure (PKI) component or is implemented according to a lightweight directory access protocol (LDAP).

Figure 2:
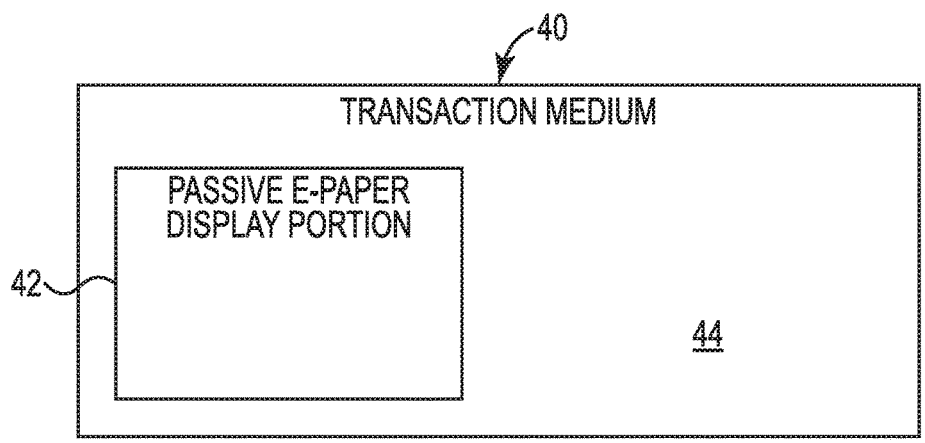
FIG. 2 is a block diagram schematically illustrating a transaction medium including at least a passive e-paper display portion, according to one example of the present disclosure.

In some examples, the security arrangement 20 of FIGS. 1A-1B is at least partially implemented via a transaction medium 40, which is schematically illustrated in FIG. 2. In some examples, the transaction medium takes the form of a generally rectangular card, such as the ubiquitous format (i.e. size, shape) of credit cards, debit cards, personnel badges, access badges, gift cards. However, the transaction medium 40 is not limited to the card format and can take other shapes, such as but not limited to, circular shapes, triangular shapes, etc.

In some examples, the transaction medium 40 comprises at least one passive e-paper, display portion 42 and at least one non-e-paper, portion 44, as shown in FIG. 2. In some instances, the passive e-paper display portion 42 is blank, i.e. does not bear any formed image. However, when desired, select images can be written to the passive e-paper display portion 42, which will retain the images until a later time when the image is erased and/or another image is written to the passive e-paper display portion 42. In some examples, the written image is the first expression 22 of the authentication element.

Figure 3:
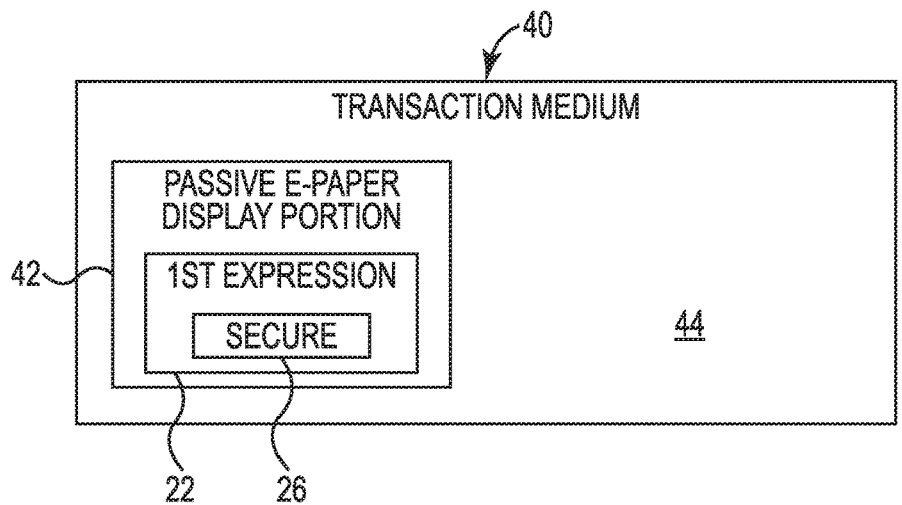
FIG. 3 is a block diagram schematically illustrating a transaction medium including at least a passive e-paper display portion on which is written a secure, first expression of an authentication element, according to one example of the present disclosure.

In some examples, as shown in FIG. 3, the passive e-paper display portion 42 displays the first expression 22 of the authentication element in a secure representation 26 with the first expression 22 being related to the second expression 24 of the authentication element. However, in at least the example shown in FIG. 3, the second expression 24 is not visible on the non e-paper portion 44. In some examples, the second expression 24 is accessible independent of transaction medium 40 or via an on-board memory resource of the transaction medium 40, as later further described in association with at least FIG. 11.

Figure 4:
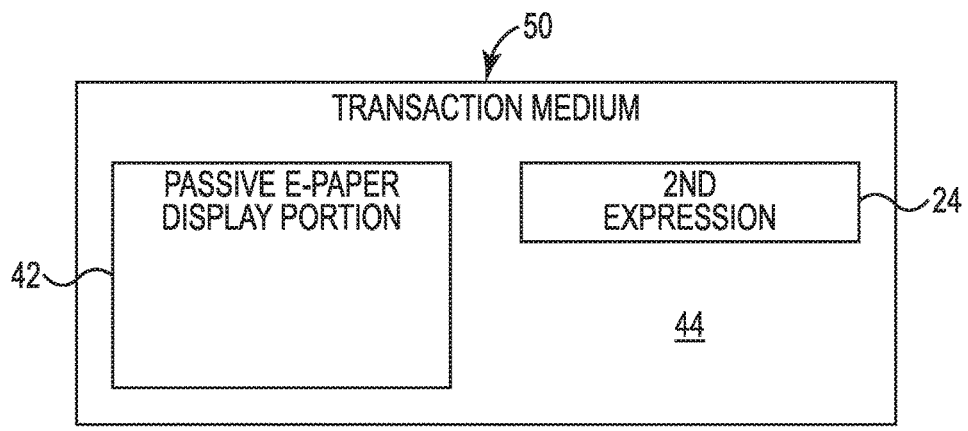
FIG. 4 is a block diagram schematically illustrating a transaction medium including at least a passive e-paper display portion and a non e-paper portion on which is written a second expression of an authentication element, according to one example of the present disclosure.
Figure 5:
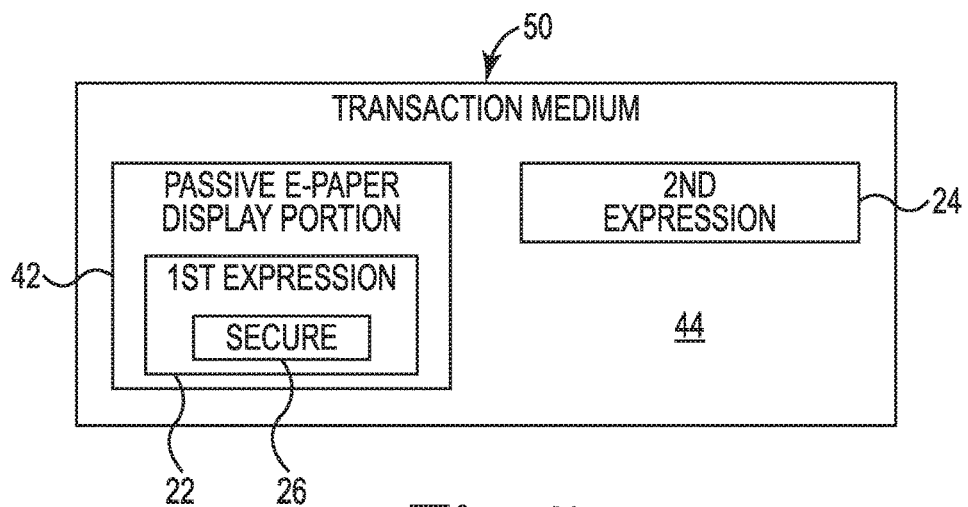
FIG. 5 is a block diagram schematically illustrating a transaction medium including at least a passive e-paper display portion on which is written a secure, first expression of an authentication element and a non e-paper portion on which is written a second expression of the authentication element, according to one example of the present disclosure.

FIGS. 4-5 are block diagrams schematically illustrating a transaction medium 50, according to some examples of the present disclosure. In one example, the transaction medium 50 comprises at least some of the substantially the same features and attributes as transaction medium 40 as previously described in association with FIGS. 1-3, except with the second expression 24 of the authentication element being visibly present on the non e-paper portion 44 of the transaction medium 50. In particular, the second expression 24 is accessible via being permanently visible on the non e-paper portion 44 of the transaction medium 50 as shown in FIG. 4 whether or not the first expression 22 is present on the passive e-paper display portion 42, which is shown blank in FIG. 4.

However, in some examples, upon the first expression 22 being written to the passive e-paper display portion 42, both the first expression 22 and second expression 24 are simultaneously present or visible on the transaction medium 50 allowing a comparison or evaluation of their relation to each other.

In some examples, transaction medium 50 is arranged without an on-board power source and/or without circuitry. In other words, the transaction medium includes no "direct" power mechanism or circuitry to write or erase an image (such as first expression 22) on the passive e-paper display portion 42, except for a common electrode to enable contactless direction of ions onto the passive e-paper display portion 42 to cause image formation thereon. This latter aspect is described in further detail in association with at least FIG. 10.

FIG. 6 is block diagram schematically illustrating a terminal 100 for use with a transaction medium 40 (or 50), according to one example of the present disclosure. In general terms, the terminal 100 is a facility or station at which a transaction medium 40 (or 50) is presented to perform a transaction, such as a financial transaction, an information transaction, a supply chain transaction, etc. In some examples, an information transaction includes a physical access transaction, a personnel identification transaction, an electronic access transaction, etc. Moreover, prior to any transaction being performed, the user is authorized to use the terminal with the transaction medium 40,50 and then transaction medium 40, 50 is authenticated via the terminal 100 to ensure its validity or genuineness.

While authorization and authentication establish a threshold (via their transaction medium 40, 50) before a user can deploy their access rights, in some examples the access rights are further dependent on other parameters set by the general security arrangement to which the terminal 100 acts a gateway. In some examples, the access rights depend on which applications and/or services a particular user has permission to use or depend on a geographic location or type of business. In some examples, the access rights depend on a current content state of the card and/or imager 120 or depend on user preferences. In some examples, such post-authorization, post-authentication access rights depend on user assets, such as if the transaction medium 40, 50 also acts as a financial transaction card (e.g. credit card, debit card, loyalty card, etc.) in addition to the function of the transaction medium 40, 50 as a tool for authorization and/or authentication.

With this in mind, as shown FIG. 6, in some examples terminal 100 includes a control portion 102, an authorization module 110, imager 120, and a first reader 122. In some examples, control portion 102 provides control of the general operation of terminal 100 and includes an access manager to manage authorizations and authentications via the terminal 100. At least one example of control portion 102 is further described later in association with at least FIG. 19.

As represented by directional arrow Y, the terminal 100 is arranged to enable relative movement between a transaction medium 40, 50 and the terminal 100. Further details regarding such relative movement are later addressed in association with at least FIG. 12.

In general terms, upon a user authorization via authorization module 110, the imager 120 writes the first expression 22 (in a secure representation) of an authentication element in the passive e-paper display portion 42 of the transaction medium 40, 50. In other words, the writing of the first expression 22 via the imager 120 does not occur until after, and unless, a successful user authorization has been completed. The reader 122 reads the secure first expression from the passive e-paper display portion 42, wherein authentication is determined via a comparison of the secure first expression 22 to a non-secure expression 24, such as but not limited to, instances in which the non-secure expression is visible on non e-paper portion 44 of the transaction medium 40, 50.

In some examples, terminal 100 is associated with and/or incorporates a user interface 130, as shown in FIG. 7. In general terms, the user interface 130 enables the authorization module 100 to receive and send authorization-related information relative to the user, as well as enabling other forms of user participation at terminal 100. In some examples, user interface 130 includes a display 132 and an input 134. The display 132 displays information to at least a user and/or operator of the terminal 100, while input 134 enables entry of information pertinent to the authentication and/or subsequent transaction. Input 134 can take many forms including a keypad, mouse, touchpad, etc. In some instances, display 132 and input 134 are combined into a graphical user interface with touchpad capabilities. Additional features and attributes of some examples of user interface 130 are described in association with user interface 366 of FIG. 19.

In some examples, operative coupling of the transaction medium 40, 50 relative to terminal 100 enables the passive e-paper display portion 42 to act as a display for terminal 100, as shown in FIG. 8. In some instances, the passive e-paper display portion 42 is the sole display for user interaction with the terminal 100 while in other instances, the passive e-paper display portion 42 is in addition to at least one display of the terminal 100, such as display 132 of user interface 130. In instances in which the passive e-paper display portion acts a sole display for terminal 100, this arrangement provides additional security for the terminal 100 because one would not be capable of successfully operating the terminal without an appropriate transaction medium 40, 50, which is capable of displaying authorization-related information and authentication-related information in association with the particular type of terminal 100 for which the transaction medium 40, 50 is adapted.

In some examples, the transaction medium 40, 50 is automatically positionable relative to the terminal 100 to permit user observation of the passive e-paper display portion 42. In some examples, the transaction medium 40 is moved to an observation position as shown in FIG. 8 after each instance of writing to or reading from the transaction medium 40 via the imager 120 and reader 122 of terminal 100, respectively.

In general terms and with further reference to FIG. 6, upon operative coupling of the transaction medium 40 relative to terminal 100, the terminal 100 initiates an authorization activity via authorization module 110 which acts a first security challenge. In particular, authorization module 110 causes a display (e.g. display 132 and/or display portion 42 of transaction medium) to pose at least one security challenge to the user at the terminal 100.

In some examples, authorization module 110 includes the features and attributes of authorization module 150 shown in FIG. 9. As shown in FIG. 9, authorization module 150 includes a security question function 152, a log-in function 154, an ID card function 156, and other function 158.

The security question function 152 presents a security question to the user via the display (132 in FIG. 7 or 42 in FIG. 8) associated with terminal 100. Some non-limiting examples of topics of typical security questions include "mother's maiden name", "first pet's name", "first school", "favorite movie", etc. Some non-limiting examples of security questions include the use of mnemonics to which a user knows an associated response.

In reply, the user uses input 134 of user interface 130 to provide an answer to the security question. As familiar to those skilled in the art, such answers are typically stored in a database accessible by the terminal 100 and are based on a prior interaction in which the user provided such information in anticipation of making later attempts to gain access via the terminal 100. As noted later, in some examples this authorization related information (e.g. answers) can be stored elsewhere.

Upon a correct match between the question and answer, the authorization module 150 indicates success via the display (42, 132) and/or moves to further authorization activity, further authentication activity, etc.

In some examples, authorization is implemented via a log-in function 154 of authorization module 150 in which the terminal 100 (via the display 42 and/or 132) prompts a user for a user name and a password. Upon successful entry of the correct username/password, the terminal confirms proper authorization.

In some examples, authorization is implemented via an ID card function 156 in which a user presents an ID card to an operator of the terminal or presents the ID card to the terminal 100, which reads (via first reader 122 or other reader) the ID card to determine authorization. In some examples, ID card is read by a device other than terminal 100 and then sends authorization-related information based on the ID card to the ID card function 156 of the authorization module 150. In some examples, other out-of-band schemes are used to supply at least some user authorization credentials to terminal 100 in order to facilitate authorization at terminal 100.

In some examples, at least two of the various authorization functions are implemented in order for the terminal 100 to declare a successful authorization of a particular user and transaction medium. For instance, in some examples, successful engagement by the user via both the log-in function 154 and the ID card function 156 is demanded prior to the authorization module 150 confirming proper user authorization.

Accordingly, in some examples, the first security challenge performed via authorization module 110, 150 employs information separate from, and independent of, the first expression 22 and second expressions 24 of the authentication element. In other words, in at least some examples of the present disclosure, user authorization is distinct from authentication of the transaction medium 40, 50.

In some examples, the transaction medium 40, 50 acts as part of the authorization protocol, in which the physical presence of the transaction medium 40, 50 provides at least part of the log-in information associated with log-in function 154.

In some examples, via other function 158, other forms of authorization processes or activities are employed alone and/or in combination with the above-described authorization functions.

FIG. 10 is a block diagram schematically illustrating terminal 100 in association with a memory resource 172, according to one example of the present disclosure. In general terms, the memory resource 172 shown in FIG. 10 represents a location or manner in which the terminal 100 obtains information pertinent to determining authorization and/or authentication in association with the transaction medium 40, 50 presented at the terminal. In some examples, the memory resource 172 is a cloud-based memory resource 174 with which the terminal 100 communicates via wired or wireless communication protocols. In some examples, terminal 100 includes a local agent for facilitating communication and operation via the cloud-based resource 174.

In some examples, the terminal 100 includes or is in a communication with an internal or local memory resource 176, such that communication to and from the cloud is not employed. In some examples, the local memory resource 176 includes a local network including terminal 100.

In some examples, the terminal 100 includes a removable memory resource 178, which is removably couplable relative to (or inserted into) terminal 100 for supporting authorization and/or authentication functions. In one aspect, the removable memory resource 178 enables robust secure authorization and/or authentication in remote locations "off the grid" and/or in catastrophic situations in which normal communication protocols (wireless, internet, cloud, etc.) and/or normal electrical power sources are unavailable. In some examples, the removable memory resource 178 comprises a trusted platform module (TPM).

In some examples, terminal 100 employs a combination of the various memory resources 174, 176, 178.

In some examples, when the second expression 24 of the authentication element is not permanently visible on the transaction medium 40, 50, the second expression 24 is accessible one of the memory resources 174, 176, 178 associated with terminal 100, which are made accessible to the terminal 100 following user authorization. Alternatively, the second expression 24 is accessible via an on-board memory resource of the transaction medium 40, 50, as further described below in association with at least FIG. 11. In some examples, even if the second expression 24 of the authentication element is permanently visible on the transaction medium 40, 50, the second expression 24 is also accessible via one of the memory resources 174, 176, 178 associated with terminal 100, which are made accessible to the terminal following user authorization. Alternatively, the second expression 24 is accessible via an on-board memory resource 190 of the transaction medium 40, 50, as further described below in association with at least FIG. 11. In these instances, electronic access to the second expression of the authentication element facilitates faster and/or automated comparison of the second expression relative to the secure, first expression.

In some examples, the transaction medium 40, 50 is not used to perform transactions subsequent to authorization and authentication, but instead the transaction medium 40, 50 is used solely to establish authorization and authentication to use terminal 100. Accordingly, in some examples, after the transaction medium 40, 50 accomplishes this task, a second transaction medium or other modality is exploited to perform an action or transaction of interest.

In some examples, the transaction medium 40, 50 includes an on-board memory resource 190 on which can be stored the second expression 24, among information pertinent to operation of transaction medium 40, 50 in relation to terminal 100 and/or transactions pursuant to transaction medium 40. In some examples, the on-board memory resource 190 of a transaction medium 40, 50 stores authorization-related and/or authentication-related, such as queries, answers, logins, relational information regarding the first and second expressions of the authentication element, etc.

FIG. 11 schematically illustrates the on-board memory resource 190, according to one example of the present disclosure. In some examples, the on-board memory resource 190 is embodied in a swipeable magnetic stripe 192, such as those typically found on credit cards, debit cards, gift cards, etc. In some examples, the on-board memory resource 190 is embodied in an integrated circuit (IC) chip 194. In some examples, the IC chip 194 comprises a smart chip, at least of the type employed on chip-and-pin (e.g. EMV) cards. In some examples, the on-board memory resource 190 comprises a two-dimensional (2D) code, frequently referred to as a quick response (QR) code 196. In some examples, the on-board memory resource 190 comprises a one-dimensional (1D) bar code 198. In some examples, the on-board memory resource 190 comprises a trusted platform module (TPM) 199.

In one aspect, in examples in which the second expression is accessible via the on-board memory resource 190, it provides the opportunity for terminal 100 to electronically read the second expression 24 for comparison with the first expression 22, which can be electronically or optically read via first reader 122 of terminal. In this way, comparison and evaluation of the respective first and second expressions 22, 24 relative to each can be performed automatically via terminal 100. If the second expression is visible on the transaction medium, then an operator at the terminal can, in some instances, provide further evaluation such as determining whether the visible second expression 24 matches the electronically readable second expression 24, which can be made available in human readable form to the operator via user interface 130.

In some examples, the on-board memory resource 190 is embodied in a combination of the various memory modalities 192, 194, 196, and 198.

Once an authorization has been completed via terminal 100, the terminal 100 commences a second security challenge which begins via the terminal 100 causing the first expression 22 of the authentication element to be written in a secure representation to the passive e-paper display portion 42 of transaction medium 40, 50. In some examples, the written, secure first expression 22 is read (e.g. optically) by the first reader 122 of terminal 100 and then compared to the second expression 24 of the authentication element. In examples in which the second expression 24 is permanently visible on the non e-paper portion 44 of transaction medium 40, the second expression can be optically read by first reader 122 and processed and compared to the secure first expression 22.

In some examples, the authentication element (as embodied in the first and second expressions 22, 24) includes a shared secret (e.g. nonce, key, etc.) such that the terminal 100 will determine an authentic relationship between the first and second expressions 22, 24 when each of the respective first and second expressions 22, 24 have the same shared secret.

When the second expression 24 is not present on the non e-paper portion 44, the second expression 24 is accessed from an on-board memory resource of the transaction medium, as in FIG. 11, and/or from a memory resource accessible via terminal, as in FIG. 10. In some examples, the second expression 24 is received by the user and/or operator of a terminal via an out-of-band communication, such as email, text, instant messaging, Twitter, etc.

Based on the comparison and evaluation, if the secure first expression 22 is substantively related to the second expression 24 in the expected way, then the terminal 100 concludes that proper authentication is present.

In some examples, upon completing a successful authentication, the imager 120 of the terminal 100 is employed to update at least one portion of the first expression 22 in the secure representation (in passive e-paper display portion 42)

while maintaining relation to the second expression 24 of the authentication element. In some examples, the updating includes the imager 120 writing a security string/nonce corresponding to successful user authorization, wherein the added security string/nonce forms part of the first expression 22 of the authentication element. In some examples, the newly written security string/nonce is independent from, and separate from, the original first expression 22.

Once authentication is confirmed, the user is free to engage in their desired transaction, whether it be a financial transaction, a security transaction, a physical access transaction, an electronic access transaction, information transaction, a supply chain transaction, etc.

In some examples, such transactions are performed via the terminal 100 using the transaction medium 40, 50 by employing additional/other information accessible via the transaction medium 40, 50.

In some examples, such transactions are performed independent of the terminal 100 after the terminal 100 communicates a successful authentication message to a pertinent facility, person, etc.

In some examples, the passive e-paper display portion 42 of the transaction medium 40 includes a renewable, variable personal identification number (PIN). After completion of a transaction (following the above-described authorization and authentication via terminal 100), the imager 120 of the terminal 100 rewrites the PIN on the passive e-paper display portion 42. In some examples, the PIN is present on the passive e-paper display portion 42 simultaneous with the first expression 22.

In some examples, the PIN is used to gain initial authorization, such as via the authorization module 110 (FIG. 6).

In some examples, after a successful authorization and successful authentication, the subsequent transaction (for which security was provided) is automatically initiated by terminal 100 via display 132 in user interface 130 and/or via passive e-paper display 42 of transaction medium 40 (when operatively coupled to terminal 100). Alternatively, in some examples, after a successful authorization and successful authentication, terminal 100 (via display 132 or passive e-paper display 42) provides an automatic query to the user to identify which type of transaction is to be initiated.

In some examples, in addition to the above arrangement, additional security and assurance is provided via the system communicating the first access element 22 and/or second access element 22 to the user and/or operator of the terminal 100 via a separate communication channel such as email, text (e.g. SMS), instant messaging, Twitter, etc. In some instances, these communications are considered out-of-band communications.

In some examples, in the event that authorization and/or authentication is not permitted for a particular transaction medium 40, 50, terminal 100 acts to write on the passive e-paper display portion 42 a corresponding indication. For example, the terminal 100 can write the term "INVALID", "UNAUTHORIZED ATTEMPT", or similar language on the passive e-paper display portion 42 or store similar indications in on-board memory resource 190. In some examples, terminal 100 (and its associated systems) would bar future use of the transaction medium 40, 50.

Figure 12:
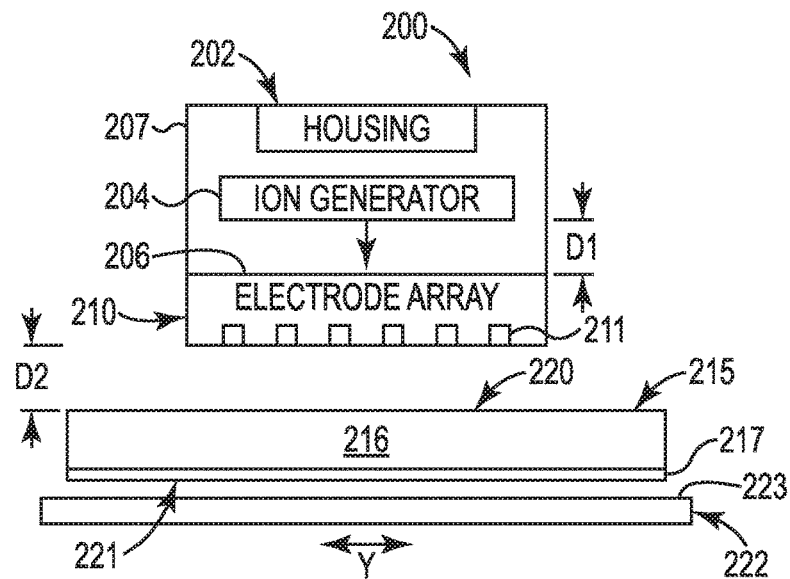
FIG. 12 is a block diagram of an ion writing assembly, according to one example of the present disclosure.

FIG. 12 is a block diagram schematically illustrating an imaging system 200 for causing image formation on passive e-paper 215, according to one example of the present disclosure. As shown in FIG. 12, the imaging system 200 includes the ion writing unit 202 and a support 222. In some examples, the imaging system 200 is deployed as the imager 120 in the terminal 100 in FIG. 6.

In some examples, ion writing unit 202 includes a housing 207 containing and at least partially enclosing an ion generator 204, as shown in FIG. 12. An electrode array 210 is located at one exterior portion 206 of the housing 207. The electrode array 210 includes an array of individually addressable, ion passage nozzles 211, which are selectively activated (via varying an electrode potential) to be open or closed. Open nozzles 211 allow the passage of ions therethrough, while closed nozzles 211 block the passage of ions. Accordingly, the addressable electrode array 210 provides for temporal and spatial control of charges onto e-paper 215. The ion generator 204 is positioned within housing 207 to be spaced apart from electrode array 210 by a distance D1. In some examples, ion generator 204 is a corona-generating device.

The term "charges" as used herein refers to ions (positive or negative), which are also sometimes referred to as free electrons. For a given ion generator, one type of charge (e.g. positive) is used to write to the e-paper while the opposite charge (e.g. negative) is used to erase images on the e-paper, which typically occurs just before writing. It will be understood that the opposite convention can be adopted in which negative charges are used to write to the e-paper and positive charges are used to erase the e-paper.

Via support 222, ion writing unit 202 and passive e-paper 215 are capable of movement relative to each other during such image formation, as represented via directional arrow Y. In particular, in some examples, support 222 acts to releasably support e-paper 215 (at least during relative motion between ion writing unit 202 and e-paper 215) to enable e-paper 215 to be positioned for receiving charges directed from writing unit 202. In one aspect, support 222 is arranged as part of a positioning mechanism that controls relative movement between ion writing unit 202 and support 222, as represented via directional arrow Y. In another aspect, a top surface 223 of support 222 is spaced from bottom surface of the electrode array 210 by a distance D2.

As shown in FIG. 12, in at least some examples, the e-paper media 215 includes a charge-responsive layer 216 that includes components that switch colors when a field or charges are applied to it. In some examples, the e-paper 215 includes the charge-responsive layer 216 and a conductive layer 217 that serves as a counter-electrode on one side of the e-paper. In some examples, the color-switching components within the charge-responsive layer 216 include pigment/dye elements, which are contained in microcapsules present in a resin/polymer material, as further illustrated later in one example in association with FIG. 14. In some examples, an additional functional coating is included on top of the charge-responsive layer 216.

With this in mind, ion generator 204 directs air-borne charges (e.g. charged ions) in a directed pattern via the individually addressable nozzles 211 of electrode array 210 onto an imaging surface of the passive e-paper 215, which responds by switching an optical state of colored particles in e-paper 215 based on the location of the received charges on the imaging surface.

Imaging surface 220 of e-paper 215 is opposite conductive counter electrode 217. A ground return path connected to counter electrode 217 provides a path for counter charges to flow to counter electrode 217, which keeps e-paper 215 substantially charge-neutral in spite of charges deposited on imaging surface 215. In some examples, counter electrode 217 is at ground. In some examples, counter electrode 217 is at any suitable reference potential to provide the fields suitable to extract charges from ion generator 204.

E-paper 215 is bi-stable, such that a collection of light-absorbing and light-reflecting states across e-paper 215 remains until sufficient charges or electrical fields are applied to e-paper 215. In some examples e-paper 215 is a passive e-paper that does not include electronics for changing the state of the e-paper. In other words, the e-paper media 215 is passive in the sense that it is re-writable and holds an image without being connected to an active power source during the writing process and/or after the writing is completed. In another aspect, the e-paper media 215 lacks internal circuitry and does not have an internal power supply. Moreover, other than power provided to a counter electrode to act as a biasing element, no power is directed into or onto the e-paper 215.

Figure 13:
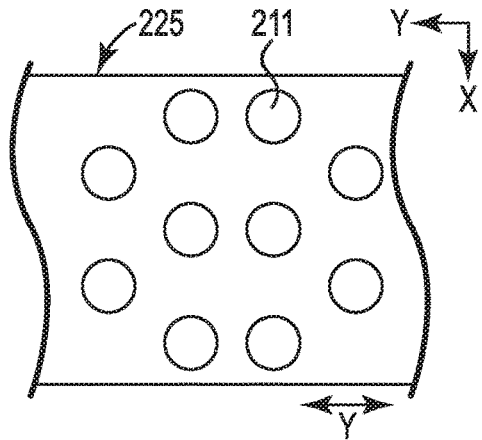
FIG. 13 is a partial top plan view schematically illustrating an electrode array of individually addressable nozzles, according to one example of the present disclosure.

In some examples, as shown in FIG. 13, the electrode array 210 comprises a two-dimensional array 225 of individually addressable nozzles 211 to provide high speed directing of charges. As at least partially represented by the patter shown in FIG. 13, the various nozzles 211 are strategically patterned (e.g. location and spacing) to prevent unwanted charge deposition patterns on the imaging substrate (e.g. e-paper media) that would otherwise hamper quality imaging.

Figure 14:
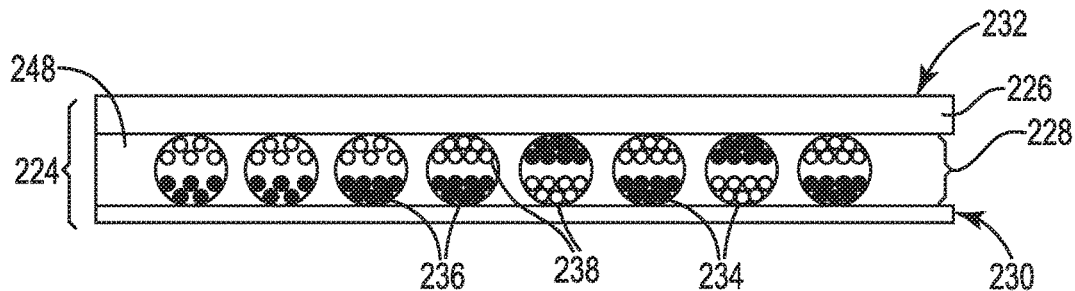
FIG. 14 is sectional view of an e-paper assembly, according to one example of the present disclosure.

In some examples, passive e-paper 215 takes the form shown in FIG. 14, according to one example of the present disclosure. As shown in FIG. 14, charge-responsive layer 228 includes capsules 234 containing a dispersion of charged color particles (e.g. pigment or dye) in dielectric oils. This dispersion of charged color particles includes black or dark, light absorbing, particles 236 and white, light reflecting, particles 238. A resin or polymer binder 248 encapsulates pigment capsules 234 of charge-responsive layer 228. In some examples, black particles 236 drift toward functional coating layer 226 and white particles 238 drift toward counter electrode layer 230 after positive charges are placed on imaging surface 232. In some examples, white particles 238 drift toward functional coating layer 226 and black particles 236 drift toward counter electrode layer 230 after positive charges are placed on imaging surface 232.

Figure 15:
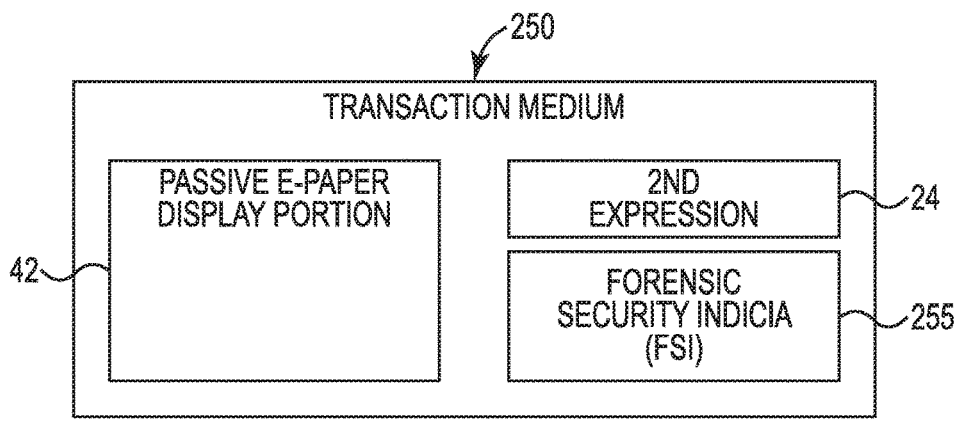
FIG. 15 is block diagram schematically illustrating a transaction medium including at least a passive e-paper display portion, a non e-paper portion on which is written a second expression of an authentication element and forensic security indicia, according to one example of the present disclosure.

FIG. 15 is a block diagram schematically illustrating a transaction medium including a forensic security indicia 255, according to one example of the present disclosure. In some examples, the transaction medium 250 includes at least some of substantially the same features and attributes as transaction medium 40, 50, as previously described in association with FIGS. 1-14. As shown in FIG. 15, transaction medium 250 includes passive e-paper display portion 42 and a second expression 24 of an authentication element related to a first expression 22 of an authentication element writable onto the passive e-paper display portion 42, as previously described in association with at least FIGS. 1-14.

In general terms, the forensic security indicia 250 provides an additional level of physical security to ensure authenticity of the transaction medium 250 presented at the terminal 100. Accordingly, even in the event that the authentication element or authorization scheme(s) associated with the terminal 100 and/or transaction medium 250 were compromised in some way, the forensic security indicia 255 would provide an additional mechanism by which to evaluate the authenticity of a transaction medium 250.

In some examples, the forensic security indicia 255 is substantively linked to the first expression 22 of the authentication element. In some examples, the forensic security indicia 255 is substantively independent of the first expression 22 of the authentication element. In some examples, the forensic security indicia 255 is separate and distinct from the second expression 24 of the authentication element.

Figure 16:
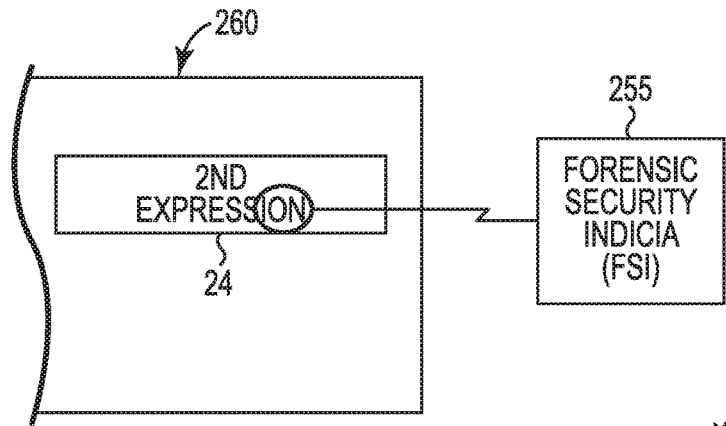
FIG. 16 is a block diagram schematically illustrating a transaction medium similar to the transaction medium of FIG. 4, with the second expression of the authentication element incorporating a forensic security indicia, according to one example of the present disclosure.

In some examples, the forensic security indicia 255 is embodied into at least a portion of the second expression 24, as shown in FIG. 16.

In some examples, the forensic security indicia 255 includes a portion separate from the second expression 24 and a portion embodied in at least a portion of the second expression 24, as shown in FIG. 16.

Figure 17:
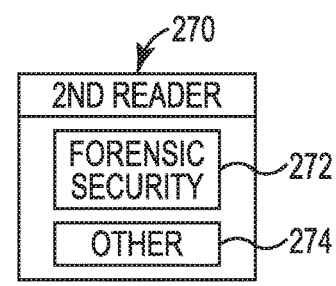
FIG. 17 is a block diagram schematically illustrating a second reader for association with a terminal, according to one example of the present disclosure.

In some examples, as shown in FIG. 17 a second reader 270 includes a forensic security indicia (FSI) function 272 to optically read or interpret the forensic security indicia and "other" function 274 to read other elements, such as a human readable, permanently visible second expression.

In one example, at least a component of the second reader 270 includes a forensic imaging device and related image analysis system, such as that disclosed at Simske et al., *High-Resolution Glyph-Inspection Based Security System*, HP Laboratories, HPL-2010-43, 2010. As disclosed therein, in some examples, the imaging device comprises a high resolution, Dyson Relay lens-based CMOS imaging device.

Figure 18:
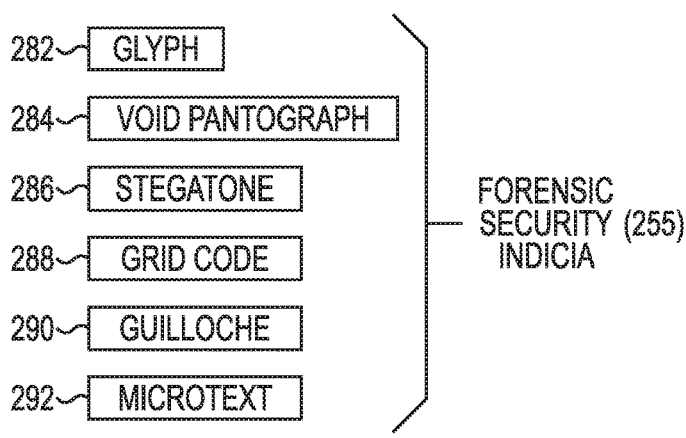
FIG. 18 is a block diagram schematically illustrating a method of using a transaction medium in a security protocol, according to one example of the present disclosure.

In some examples, forensic security indicia (FSI) 255 used in the above-described examples can take many different forms, as shown in FIG. 18. As shown in FIG. 18, the forensic security indicia (FSI) 255 is embodied in a glyph form 282, a void pantograph form 284, a stegatone form 286, a grid code form 288, a guilloche form 290, and a microtext form 292. In one example, the glyph form 282 is recognizable and readable via an imaging device, such as the above-described high resolution, Dyson Relay, lens-based CMOS imaging device. In some examples, the stegatone form 286 is at least consistent with encoding protocols as described in Ulichney et. al, *Encoding Information in Clustered-Dot Halftones*, 26th International Conference on Digital Printing Technologies, 2010.

In some examples, a transaction medium 250 includes a forensic security indicia (FSI) 255 permanently visible on the non e-paper portion 44 of transaction medium 250 and includes passive e-paper display portion 42 for selectively displaying (upon authorization) a first expression 22 of an authentication element. However, in this example, the transaction medium 250 does not include a second expression 24 of the authentication element permanently visible on non e-paper portion 44 of transaction medium 250. Instead, the second expression 24 is accessed in other ways, as previously described in association with at least FIGS. 10-11.

Accordingly, in some examples, in addition to the above arrangements involving forensic security indicia 255, additional security and assurance is provided via the system communicating the first expression 22 and/or second expression 24 to the user and/or operator of the terminal 100 via a separate communication channel such as email, text (e.g. SMS), instant messaging, Twitter, etc. In some instances, these communications are considered out-of-band communications.

In some examples, when the forensic security indicia 255 is permanently present on the non e-paper portion 44 of the transaction medium, the forensic security indicia 255 is expressed via the substrate that forms the transaction medium 250. In particular, features forming the surface of the transaction medium 250 (i.e. the surface distinct from the passive e-paper display portion 42) provide enough random or natural variability to be detected at the super-high resolution (e.g. 8000 lines/per inch) of the second reader 270 in its forensic security mode 272 (e.g. Dyson Relay, lens-based CMOS imaging device). Accordingly, these features on the surface of the substrate naturally function as the forensic security indicia 255 on the non e-paper portion 44 of the access medium 40. Accordingly, in this example, an artificially-constructed, separate forensic indicia 255 need not be added onto the substrate of the transaction medium 250.

Figure 19:
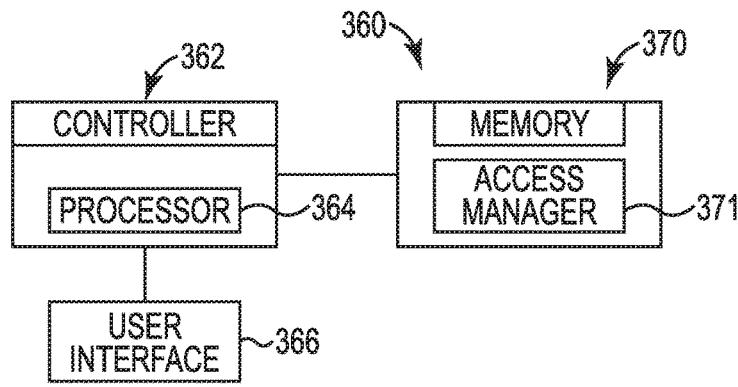
FIG. 19 is a block diagram schematically illustrating a control portion for an image writing unit, according to one example of the present disclosure.

FIG. 19 is a block diagram schematically illustrating a control portion 360, according to one example of the present disclosure. In some examples, control portion 360 includes a controller 362, a memory 370, and a user interface 366.

In general terms, controller 362 of control portion 360 comprises at least one processor 364 and associated memories that are in communication with memory 370 to generate control signals to direct operation of at least some components of the systems and components described throughout the present disclosure. In some examples, these generated control signals include, but are not limited to, employing access manager 371 to manage operation of a terminal 100 in association with a transaction medium to facilitate security measures. In some examples, the control portion 360 comprises the control portion 102 that is present in the terminal 100 of FIG. 6 or accessible by the terminal 100.

In particular, in response to or based upon commands received via a user interface 366 and/or machine readable instructions (including software), controller 362 generates control signals to implement security measures and/or protocols in accordance with at least some of the previously described examples and/or later described examples of the present disclosure. In some examples, controller 362 is embodied in a general purpose computer while in other examples, controller 362 is embodied in at least some of the components described throughout the present disclosure, such as terminal 100.

For purposes of this application, in reference to the controller 362, the term "processor" shall mean a presently developed or future developed processor (or processing resources) that executes sequences of machine readable instructions (such as but not limited to software) contained in a memory. In some examples, execution of the sequences of machine readable instructions, such as those provided via memory 370 of control portion 360 cause the processor to perform actions, such as operating controller 362 to implement security protocols as generally described in (or consistent with) at least some examples of the present disclosure. The machine readable instructions may be loaded in a random access memory (RAM) for execution by the processor from their stored location in a read only memory (ROM), a mass storage device, or some other persistent storage (e.g., non-transitory tangible medium or non-volatile tangible medium, as represented by memory 370. In some examples, memory 370 comprises a computer readable tangible medium providing non-volatile storage of the machine readable instructions executable by a process of controller 362. In other examples, hard wired circuitry may be used in place of or in combination with machine readable instructions (including software) to implement the functions described. For example, controller 362 may be embodied as part of at least one application-specific integrated circuit (ASIC). In at least some examples, the controller 362 is not limited to any specific combination of hardware circuitry and machine readable instructions (including software), nor limited to any particular source for the machine readable instructions executed by the controller 362.

In some examples, user interface 366 comprises a user interface or other display that provides for the simultaneous display, activation, and/or operation of at least some of the various components, functions, features, and of control portion 360 and/or ion writing assemblies, as described throughout the present disclosure. In some examples, at least some portions or aspects of the user interface 366 are provided via a graphical user interface (GUI). In some examples, user interface 366 comprises at least the features and attributes of the user interface 130 in FIG. 7, or vice versa.

Figure 20:
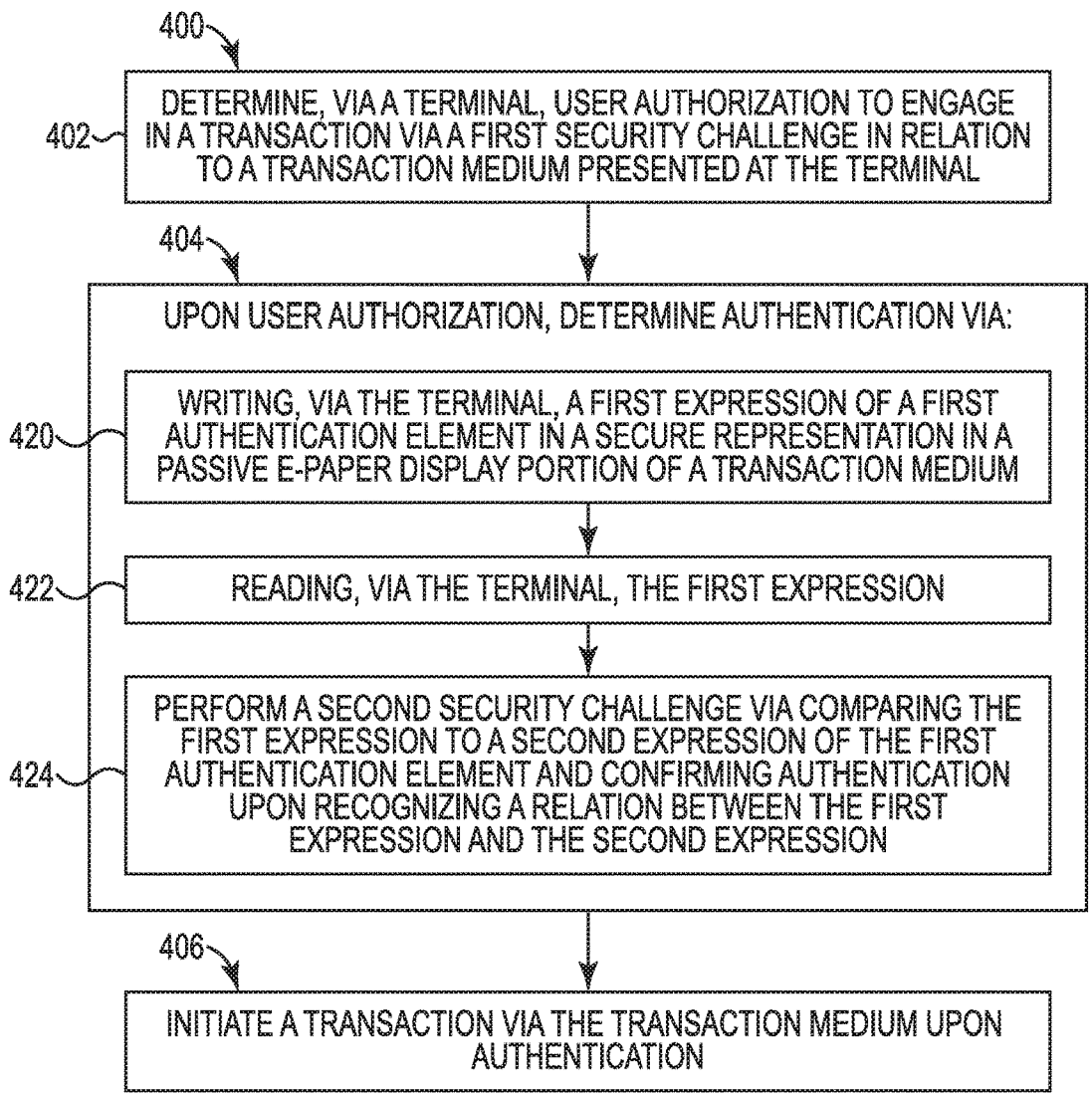
FIG. 20 is a flow chart diagram schematically illustrating a method of manufacturing an ion writing unit including flux control, according to one example of the present disclosure.

FIG. 20 is a flow chart diagram 401 illustrating a method 400 of implementing security measures via a transaction medium, according to one example of the present disclosure. In some examples, method 400 is performed using at least some of the components, assemblies, arrays, systems as previously described in association with at least FIGS. 1-19 and those later described in association with FIGS. 21-22. In some examples, method 400 is performed using at least some components, assemblies, arrays systems other than those previously described in association with at least FIGS. 1-19 and those later described in association with FIGS. 21-22.

At 402, method 400 comprises determining, via a terminal, user authorization to engage in a transaction via a first security challenge in relation to a transaction medium presented at the terminal. At 404, upon user authorization, authentication is determined as further described below. The authentication is determined via writing, via the terminal, a first expression of an authentication element in a secure representation in a passive e-paper display portion of a transaction medium, as at 420. As represented at 422, determining authentication also includes reading, via the terminal, the first expression. At 424, determining authentication according to method 400 includes performing a second security challenge via comparing the first expression to a second expression of the authentication element and confirming authentication upon a recognized relation between the first expression and the second expression.

At 406, upon authentication method 400 includes initiating a transaction via the transaction medium.

Figure 21:
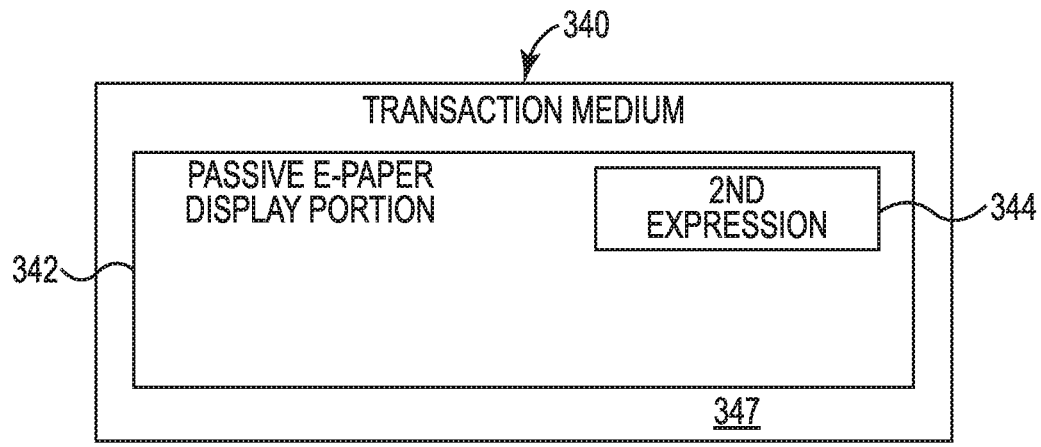
FIG. 21 is a block diagram schematically illustrating a transaction medium including at least a passive e-paper display portion on which is written a second expression of an authentication element, according to one example of the present disclosure.
Figure 22:
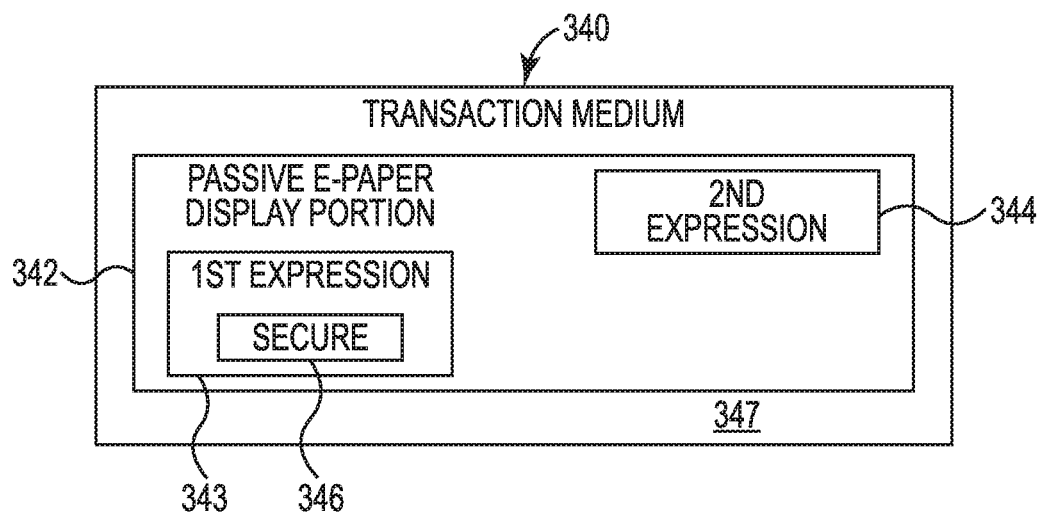
FIG. 22 is a block diagram schematically illustrating a transaction medium including at least a passive e-paper display portion on which is written a secure, first expression of an authentication element and a second expression of the authentication element, according to one example of the present disclosure.

FIG. 21 is a block diagram of a transaction medium 340, according to one example of the present disclosure. As shown in FIG. 21, transaction medium 340 comprises at least some of substantially the same features and attributes as the various transaction mediums previously described in association with FIGS. 1-19, except with the second expression 344 being formed on the passive e-paper display portion 342. While the second expression 244 may not be permanent in the same way as if printed or formed on a non e-paper portion 347, the second expression 244 is rewritten or preserved each time the first expression 343 or other elements are imaged to passive e-paper display portion 342, as shown in FIG. 22. Accordingly, prior to user authorization, the second expression 244 is visible in passive e-paper display 342, even though the first expression 343 has not yet been written to the passive e-paper display 342. However, after user authorization, when the first expression 343 is written to the passive e-paper display portion, the second expression 344 remains present and/or is re-written to the passive e-paper display portion 342 to remain generally co-located with the first expression 343. In this way, both the first and second expressions 343, 344 are available for comparison.

However, in some examples, while the second expression 344 generally remains present and visible in passive e-paper display portion, this arrangement does not preclude the terminal 100 (and associated security manager) from changing the second expression 344 to a new, different second expression, to which a new, different first expression is writable to the passive e-paper display portion. In some examples, the change-over to a new, different second expression of the authentication element is performed periodically to ensure robust security in use of the transaction medium.

As in prior examples herein, the first and second expressions 343, 344 are substantively linked or related to each other.

In some examples, a forensic security indicia (FSI) is further provided on transaction medium 340 in a manner at least consistent with the examples previously described in association with FIGS. 15-18.

At least some examples of the present disclosure are directed to providing and/or enhancing a security arrangement by which a transaction medium is used at a terminal to authenticate the transaction medium as a gateway for performing transactions subsequent to the authentication.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A transaction medium card comprising:
   a non-e-paper portion; and
   a passive e-paper display portion imaging by receiving charges on an imaging surface of the passive e-paper display portion, the passive e-paper display portion comprising a single functional coating layer providing the imaging surface, and the passive e-paper display portion to display a first expression of an authentication element in a secure representation, wherein the first expression is related to a second expression of the authentication element, wherein a comparison of the first expression and the second expression determines authentication;
   the medium further comprising:
      a forensic security indicia formed on the passive e-paper display portion, wherein the forensic security indicia is linked to the first expression of the authentication element,
      wherein the forensic security indicia is separate from, and independent of, the second expression.

2. The transaction medium card of claim 1, wherein the second expression is in a non-secure representation, and wherein the secure representation includes at least one of:
   a replication of the non-secure representation;
   a scrambled form of the non-secure representation;
   a parity-based replication of the non-secure representation;
   a bit-check-based replication of the non-secure representation;
   a compressed version of the non-secure representation;
   a digitally signed version of the non-secure-representation; and
   an encrypted version of the non-secure representation.

3. The transaction medium card of claim 1, wherein the second expression of the authentication element is accessible via at least one of:
   being visibly present on at least one of the non e-paper portion and the passive e-paper display portion;
   a memory resource associated with a terminal at which the transaction medium card is operatively couplable; and
   a memory resource of the transaction medium card.

4. The transaction medium card of claim 1, wherein the first expression is written onto the passive e-paper display portion via a terminal after user authorization at the terminal, wherein the user authorization is separate from the authentication.

5. A transaction system comprising: a terminal including:
   a first authorization module to determine user authorization upon communicative coupling of a transaction medium card relative to the terminal, wherein communication with the user occurs via at least one of a display of the terminal and a passive e-paper display portion of the transaction medium card;
   an imager to write, upon user authorization, a secure expression of an authentication element in the passive e-paper display portion of the transaction medium card via non-contact application of charges to an imaging surface of the passive e-paper display portion; and
   a reader to read the secure expression from the passive e-paper display portion,
   wherein authentication is determined via a comparison of the secure expression to a non-secure expression visible on a non-e-paper portion of the transaction medium card,
   wherein the terminal includes a forensic security reader to detect forensic security indicia on the non-e-paper portion of the transaction medium card.

6. The system of claim 5, wherein the terminal includes:
   a user interface by which the first authorization module receives and communicates authorization-related information to the user.

7. The system of claim 5, wherein the secure expression includes at least one of:
   a replication of the non-secure expression;
   a scrambled form of the non-secure expression;
   a parity-based replication of the non-secure expression;
   a bit-check-based replication of the non-secure expression;
   a compressed version of the non-secure expression;
   a digitally signed version of the non-secure expression; and
   an encrypted version of the non-secure expression.

8. A non-transitory computer readable storage medium storing instructions, executable on a processor, to:
   determine, via a terminal, user authorization to engage in a transaction via a first security challenge in relation to a transaction medium presented at the terminal;
   upon user authorization, determine authentication via:
      writing, via the terminal, a first expression of an authentication element in a secure representation in a passive e-paper display portion of the transaction medium via non-contact application of charges to an imaging surface of the passive e-paper display portion; reading, via the terminal, the first expression; and
   performing a second security challenge via comparing the first expression to a second expression of the authentication element and confirming authentication upon a recognized relation between the first expression and the second expression; and initiate a transaction via the transaction medium upon authentication,
   wherein determining user authorization via the first security challenge comprises:
      reading, via a reader of the terminal, a variable PIN on the passive e-paper display portion of the transaction medium; and
      revising, via an imager of the terminal, the variable PIN on the passive e-paper display portion after completion of the transaction.

9. The non-transitory computer readable storage medium of claim 8, wherein the instructions include:

upon completing the authentication, update via an imager of the terminal, at least one portion of the first expression in the secure representation while maintaining relation to the second expression of the authentication element.

10. The non-transitory computer readable storage medium of claim 8, wherein the determination of user authorization includes the terminal presenting the first security challenge via the passive e-paper display portion of the transaction medium.

11. The non-transitory computer readable storage medium of claim 8, wherein the first security challenge comprises at least one of:

at least one security question having a stored answer unique to user;

a username-and-password login; and a username-and-password login in combination with a machine-readable ID card, wherein the first security challenge employs information separate from, and independent of, the first and second expressions of the authentication element.

12. The non-transitory computer readable storage medium of claim 8, wherein the second expression is accessible via at least one of:

being visibly present on at least one of a non e-paper portion of the transaction medium and the passive e-paper display portion;

a memory resource on the transaction medium readable via a reader of the terminal; and a memory resource associated with the terminal.

13. The transaction medium card of claim 1, wherein the passive e-paper display portion comprises a single counter electrode layer opposite to the imaging surface.

14. The transaction system of claim 5, wherein the passive e-paper display portion comprises a single functional coating layer providing the imaging surface and a single counter electrode layer opposite to the imaging surface.

15. The non-transitory computer readable storage medium of claim 8, wherein the passive e-paper display portion comprises a single functional coating layer providing the imaging surface and a single counter electrode layer opposite to the imaging surface.

* * * * *